(12) United States Patent
Panuce

(10) Patent No.: US 7,324,314 B2
(45) Date of Patent: Jan. 29, 2008

(54) DISCONNECT SWITCH WITH EARLY BREAK FEATURE

(75) Inventor: Donald G. Panuce, Sarasota, FL (US)

(73) Assignee: Advance Controls, Inc., Bradenton, FL (US)

( * ) Notice: Subject to any disclaimer, the term of this patent is extended or adjusted under 35 U.S.C. 154(b) by 461 days.

(21) Appl. No.: 10/905,309

(22) Filed: Dec. 27, 2004

(65) Prior Publication Data

US 2006/0138869 A1   Jun. 29, 2006

(51) Int. Cl.
    *H02H 3/00* (2006.01)
(52) U.S. Cl. ............................................ 361/42; 361/2
(58) Field of Classification Search ................. 361/42, 361/2
    See application file for complete search history.

(56) References Cited

U.S. PATENT DOCUMENTS

| 3,555,396 | A |   | 1/1971  | Kalman ........................ 363/35 |
| 3,887,860 | A |   | 6/1975  | Bernhardt et al. ............ 363/57 |
| 3,947,748 | A |   | 3/1976  | Klein ........................... 363/57 |
| 4,237,531 | A |   | 12/1980 | Cutler et al. .................. 363/58 |
| 4,894,745 | A | * | 1/1990  | Akagawa et al. ............. 361/42 |
| 5,721,449 | A |   | 2/1998  | Panuce ..................... 260/16 A |
| 6,291,987 | B1|   | 9/2001  | Dean et al. ............... 324/158.1 |

\* cited by examiner

*Primary Examiner*—Stephen W. Jackson
(74) *Attorney, Agent, or Firm*—Clausen Miller, PC

(57) ABSTRACT

A disconnect switch that provides a simple and economical means for preventing the possibility of stray/surge current from damaging the solid state components of an inverter drive is provided. The disconnect switch includes early break auxiliary contact(s) that open before the standard power contacts when the switch is turned off by an operator and close after the standard power contacts when the switch is turned on by an operator.

12 Claims, 1 Drawing Sheet

DISCONNECT SWITCH WITH EARLY BREAK FEATURE

FIELD OF THE INVENTION

Figure 1:
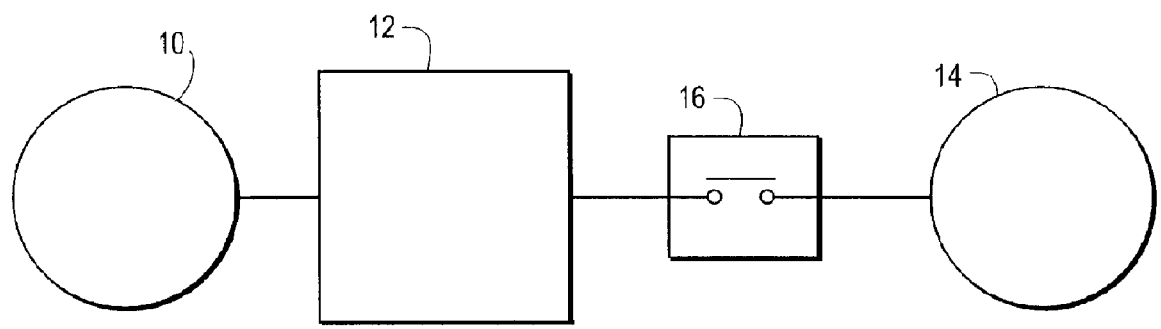

This patent relates to a disconnect switch for protecting an inverter drive, soft starter, solid state starter or other means of starting electric motors using solid state components from stray/surge power currents.

DESCRIPTION OF THE RELATED ART

Modern inverter drives are a vital and necessary part of many industrial controls. By providing an economical means of regulating the speed and performance of motors, inverter drives have gained a prominent place in today's industrial arena. Soft starters and solid state starters operate similar to inverter drives except these types of starters do not incorporate a means for speed control. For the sake of simplicity we will describe and refer to inverter drives in the remaining part of this discussion, but by implication soft starters, solid state starters and other types of starters using solid state components are included and hereinafter are referred to as inverter drives.

An inverter drive typically operates by changing alternating current (AC) power from a power source to internal direct current (DC) power. The DC power is pulsed through a series of solid-state components in the inverter drive to the output of the inverter drive. This output roughly approximates an AC sine wave. The inverter drive also has a control circuit that can change the width of the pulsed output sine wave. An electric motor wired to the output of the inverter drive reacts to this change in the width of the sine wave by changing speed. In this way the inverter drive can vary and control the speed of the motor attached to the output of the inverter drive.

Because an inverter drive utilizes solid state components to regulate, control and deliver the varying pulsed sine wave output to the motor, the inverter drive can be easily damaged or destroyed by stray/surge electrical currents. One possible cause of stray/surge electrical currents is the sudden removal of the motor from the inverter drive output while the inverter drive is supplying power to the motor. When this occurs a strong electrical stray/surge can be created that can destroy the solid-state devices within the inverter drive. Power can be suddenly removed when there is a disconnect switch between the inverter drive and the motor and an operator turns off the disconnect switch while the motor is running.

Various solutions have been developed for preventing stray/surge currents from harming the solid state components of inverter drives, including fuses and circuit breakers, voltage regulators and crowbar circuits.

Fuses and circuit breakers can prevent a power surge from damaging the solid state components of an inverter drive. If a fuse blows, it must be replaced with another fuse. Circuit breakers perform the same function as fuses but can be reset by turning off the power supply, waiting a moment, then pressing a button or flipping a switch. Some circuit breakers reset automatically. A potential disadvantage of fuses and circuit breakers is that they can take time to respond to circuit faults. The time required for the fuse or circuit breaker to blow out may be enough for inverter drive components to be damaged. Sometimes a power stray/surge can damage equipment without disturbing the fuse or circuit breaker.

Voltage regulators are circuits that regulate voltage output for any changes in input voltage or for changes in output load current demand. They essentially keep the output voltage constant during these changes. Voltage regulators are widely used for every power supply for inverter drives, controllers and operating devices in equipment. Like fuses and circuit breakers, source voltage regulators may not activate fast enough to protect inverter drives.

Crowbar circuits are generally used to protect a delicate or vital circuit. In the event of a potentially harmful stray/surge current, the crowbar circuit quickly forms a deliberate short circuit across the power supply lines, causing the system fuse or circuit breaker to blow, cutting off power to the rest of the circuit. Being electronic, crowbar circuits can respond faster than fuses and circuit breakers. However, they are not 100 percent foolproof. The crowbar circuit may not always be triggered on very short, infrequent power line transients.

Thus it is an object of the present invention to provide a simple and economical means for protecting an inverter drive from stray/surge currents.

A further object of the invention is to provide a manual or power operated disconnect switch having an early break auxiliary contact (or contacts) that opens before the standard power contacts so the inverter drive control circuit is interrupted before the standard power contacts of the disconnect switch open.

Another object of the invention is to provide a disconnect switch with early break auxiliary contact modules that can be added or removed without using special tools.

Still another object of the invention is to provide a disconnect switch having means for protecting an inverter drive from stray/surge currents that can be installed or removed without using special tools.

Yet another object of the invention is to provide a disconnect switch having means for protecting an inverter drive from stray/surge currents that can be designed as a one, two, three, four or more power pole disconnect switch.

Yet another object of the invention is to provide a disconnect switch having means for protecting an inverter drive from stray/surge currents that can be used when only a very small amount of current is available.

Further and additional objects will appear from the description, accompanying drawing, and appended claims.

SUMMARY OF THE INVENTION

The present invention is a disconnect switch for preventing the possibility of stray/surge current from damaging the solid state components of an inverter drive. The disconnect switch includes early break auxiliary contact(s) that open before the standard power contact(s) when the switch is turned off by an operator so the inverter drive control circuit is interrupted before the standard power contact(s) of the disconnect switch open. Likewise, the early break auxiliary contact(s) close after the standard power contact(s) when the switch is turned on by an operator so the inverter drive control circuit is powered up after the standard power contact(s) of the disconnect switch close.

The disconnect switch may be manufactured as an enclosed component mounted before or after the inverter drive. Alternatively, the disconnect switch may be manufactured as an open component for use within the inverter drive system in either the same enclosure or a separate enclosure.

The early break auxiliary contact(s) may be an integral part of the switch, or they may be manufactured as a module that can be removably attached to the disconnect switch. The early break auxiliary contact(s) may be gold plated for reliable use when only a very small amount of power is available from the inverter drive.

THE DRAWINGS

FIG. 1 is a schematic of an electrical circuit having a disconnect switch according to the present invention.

DETAILED DESCRIPTION OF THE INVENTION

Disconnect switches are well known in the art. They provide a rapid means for disconnecting a power supply from a circuit in the case of an emergency.

Power transients and surges are caused by sudden changes in the load in a utility circuit. One possible cause of stray/surge electrical currents is the sudden removal of the motor from the inverter drive output while the inverter drive is supplying power to the motor. When this occurs a strong electrical stray/surge can be created that can destroy the solid-state devices within the inverter drive. This situation can occur when an operator turns off a disconnect switch while the motor is running. A second possible cause of stray/surge electrical currents is the sudden removal of the power from the inverter drive input while the inverter drive is supplying power to the motor. When this occurs a strong electrical stray/surge can be created that can destroy the solid-state devices within the inverter drive. This situation can occur when an operator turns off a disconnect switch while the inverter drive and motor are running.

A heretofore unknown solution to the problem of stray/surge electrical currents caused by turning off the disconnect switch while a motor is running is to provide a disconnect switch with "early break" auxiliary contact(s) in addition to the standard break power contact(s). If an operator turns off the disconnect switch while the motor is running, the early break auxiliary contact(s) open before the standard power contact(s) so the inverter drive control circuit is interrupted before the standard power contact(s) of the disconnect switch open. If the disconnect switch is located between the inverter and the motor, the inverter drive stops sending power to the motor before the connection to the motor is removed from the inverter drive, thus preventing the electrical surge condition that could destroy the solid-state components within the inverter drive.

Likewise, when the operator turns on the disconnect switch, the early break auxiliary contact(s) close after the standard power contact(s) so the inverter drive control circuit is powered up after the standard power contact(s) of the disconnect switch close. The inverter drive begins sending power to the motor after the connection to the motor is made to the inverter drive.

If the disconnect switch is located between the source of power and the inverter drive, the inverter drive stops sending power to the motor before the connection is removed from the inverter drive, thus preventing the electrical surge condition that could destroy the solid-state components within the inverter drive.

Likewise, when the operator turns on the disconnect switch, the early break auxiliary contact(s) close after the standard power contacts so the inverter drive control circuit is powered up after the standard power contacts of the disconnect switch close. The inverter drive begins sending power to the motor after the connection to the input power is made to the inverter drive.

Referring to FIG. 1, and for purposes of example only, alternating current (AC) power from a commercial three-phase power source 10 is changed to internal direct current (DC) power by an inverter drive 12. The DC power is pulsed through a series of solid-state components in the inverter drive 12 to the output of the inverter drive 12. This output roughly approximates an AC sine wave. The inverter drive 12 also has a control circuit that can change the width of the pulsed output sine wave. An electric motor 14 wired to the output of the inverter drive 12 reacts to this change in the width of the sine wave by changing speed. In this way the inverter drive 12 can vary and control the speed of the motor 14 attached to the output of the inverter drive 12

In accordance with the present invention, a disconnect switch 16 is connected in series on the input side of the motor 14. The disconnect switch 16 preferably is a mechanical switch, with movable "standard break" power contacts coupled over the three power lines. This is typical of an application where the disconnect switch is placed between the inverter drive and the motor. A similar situation occurs when the disconnect switch is placed between the input power and the inverter drive.

In a key aspect of the invention, the disconnect switch also comprises "early break" auxiliary contact(s) that open before the standard power contact(s) so the inverter drive control circuit is interrupted before the standard power contact(s) open. Likewise, when the operator turns on the disconnect switch 16, the early break auxiliary contact(s) close after the standard power contact(s) so the inverter drive control circuit is powered up after the standard power contact(s) close.

The disconnect switch 16 can be designed as a one, two, three, four or more power pole switch. The disconnect switch may be manually operated (by a panic button, handle, toggle switch or other means) or power operated and may operate using a cam mechanism such as that disclosed in Panuce U.S. Pat. No. 5,721,449, incorporated herein by reference or any other suitable mechanism.

The disconnect switch 16 may be manufactured as an enclosed component that can be mounted and utilized remotely from the inverter drive 12. Although the disconnect switch 16 shown in FIG. 1 is mounted in series after the inverter drive 12, it should be understood that the disconnect switch 16 can be mounted either before or after the inverter drive 12. Alternatively, the disconnect switch can be manufactured as an open component for use within the inverter drive system in either the same enclosure or a separate enclosure.

Inverter drive control circuits often operate on a very small amount of power. Standard power contacts cannot reliably conduct or switch this low level of power. Thus, the auxiliary contact(s) may be gold flash plated to allow trouble free operation of the contacts while using the small power available from the control circuit of the inverter drive.

Gold plating the conventional power contact material of the auxiliary contact(s) would still allow the disconnect switch to be used in applications that use higher power control circuits. Higher power control circuit applications can "burn off" the gold flash plating of the contacts. However if this were to occur, the conventional power contact material underneath the gold flash plating would enable the switch to continue functioning.

The early break auxiliary power contact(s) can be manufactured as an integral part of the disconnect switch 16 or they can be manufactured as a module that attaches to the disconnect switch. Early break auxiliary power contact(s) can easily be added to or removed from the disconnect switch 16 by attaching or removing modules. Attaching and removing modules can be done at the factory or on site. No special tools are required to either add or remove the modules or to install or remove the disconnect switch 16 from the power circuit.

Thus there has been described a disconnect switch that provides a simple and economical means for preventing the possibility of stray/surge current from damaging the solid state components of an inverter drive. The disconnect switch includes "early break" auxiliary contact(s) that open before the standard power contacts when the switch is deactivated (turned off) by an operator. Likewise, when an operator turns on the disconnect switch the early break auxiliary contact(s) close after the standard power contacts.

Other modifications and alternative embodiments of the invention are contemplated which do not depart from the scope of the invention as defined by the foregoing teachings and appended claims. It is intended that the claims cover all such modifications that fall within their scope.

What is claimed is:

1. A disconnect switch for use with an electrical circuit to prevent stray electrical current from damaging a variable frequency inverter drive when the disconnect switch is operated, the electrical circuit comprising a power supply, a load and an inverter drive, the disconnect switch comprising:
   at least one mechanical standard break power contact; and
   at least one mechanical early break auxiliary contact that opens before the standard break power contact if an operator turns off the disconnect switch and closes after the standard break power contact if an operator turns on the disconnect switch.

2. The disconnect switch of claim 1 in which the disconnect switch is an enclosed component mounted after the inverter drive.

3. The disconnect switch of claim 1 in which the disconnect switch is an open component mounted after the inverter drive.

4. The disconnect switch of claim 1 in which the disconnect switch is an enclosed component mounted before the inverter drive.

5. The disconnect switch of claim 1 in which the disconnect switch is an open component mounted before the inverter drive.

6. The disconnect switch of claim 1 in which the inverter drive comprises an enclosure and the disconnect switch is an open component for use in the same enclosure.

7. The disconnect switch of claim 1 in which the inverter drive comprises an enclosure and the disconnect switch is an open component for use in a separate enclosure.

8. The disconnect switch of claim 1 in which the switch is manually operated.

9. The disconnect switch of claim 1 in which the switch is power operated.

10. The disconnect switch of claim 1 in which the at least one early break auxiliary contact is an integral part of the switch.

11. The disconnect switch of claim 1 in which the at least one early break auxiliary contact is manufactured as a module that can be removably attached to the disconnect switch.

12. The disconnect switch of claim 1 in which the at least one early break auxiliary contact is gold plated.

* * * * *